United States Patent
Okerlund et al.

(12) 
(10) Patent No.: US 6,690,371 B1
(45) Date of Patent: Feb. 10, 2004

(54) RELEVANT IMAGE DATA EXTRACTION FROM A MEDICAL IMAGE DATA VOLUME

(75) Inventors: Darin R. Okerlund, Muskego, WI (US); Mark E. Woodford, Waukesha, WI (US); Christopher C. Slack, New Berlin, WI (US); James Markvicka, Valrico, FL (US)

(73) Assignee: GE Medical Systems Global Technology, LLC, Waukesha, WI (US)

( * ) Notice: Subject to any disclaimer, the term of this patent is extended or adjusted under 35 U.S.C. 154(b) by 0 days.

(21) Appl. No.: 09/564,128

(22) Filed: May 3, 2000

(51) Int. Cl.[7] .............................................. G06T 17/00
(52) U.S. Cl. ..................................................... 345/424
(58) Field of Search ................................ 345/420, 424, 345/649, 423, 419, 421, 582, 606, 428, 581, 592; 382/128, 251; 128/916

(56) References Cited

U.S. PATENT DOCUMENTS 5,313,567 A * 5/1994 Civanlar et al. ............ 345/424
5,446,833 A * 8/1995 Miller et al. ................ 345/649
5,842,473 A 12/1998 Fenster et al.

OTHER PUBLICATIONS

Yoshida et al ("Clinical Planning Support System": 1993 IEEE 0272–17–16/93/1100–0076).*

Hastreiter et al ("Interactive and Intuitive Visualization of Small and Complex Vascular structures in MR and CT": 1998 IEEE 0–7803–5164–9/98).*

* cited by examiner

Primary Examiner—Mark Zimmerman
Assistant Examiner—Enrique L Santiago
(74) Attorney, Agent, or Firm—Carl B. Horton, Esq.; Armstrong Teasdale LLP

(57) ABSTRACT

A method for rapid extraction and visualization of relevant data from a volume of image data includes rapidly producing reduced-fidelity images derived from an image volume, the reduced fidelity images having an adjustable visual parameter; adjusting the visual parameter of the reduced-fidelity images during the rapid production to select a desired adjustment; producing a full-fidelity image derived from the image volume; and applying the selected adjustment to the full-fidelity image.

20 Claims, 11 Drawing Sheets

RELEVANT IMAGE DATA EXTRACTION FROM A MEDICAL IMAGE DATA VOLUME

BACKGROUND OF THE INVENTION

This invention relates generally to medical imaging, and more particularly, to methods and apparatus for rapidly extracting relevant image data from a three-dimensional volumetric data set.

A challenging problem in the area of volume visualization is the ability to extract relevant information contained within a volume of image data, for example, medical image data, in a timely fashion using a method that is simple and intuitive to an end-user.

Volume rendering (VR) is a preferred choice for visualizing a volume of medical image data. The VR process is governed by a set of curves, namely opacity and color/intensity curves. These curves determine what contribution and color intensity a given voxel (a data point within the volume) will have in the resultant 3D projection or rendering. The challenge is to determine an appropriate curve to accentuate important information (such as by providing contrast enhanced vessels, for example) for study while suppressing irrelevant information to the study (for example, scanner table and bone structures in a study of vessels). Volume clipping or cut planes also can be used to remove portions of a volume that are not of interest and that would otherwise obscure or occlude relevant tissue or anatomy. For example, volume clipping can be used to cut away an image of a rib to get an unobscured sagital view of an aorta.

A problem with known systems for rendering volumes of image data is that they are either too slow to provide immediate feedback in medical or surgical environments, or they require powerful and expensive image processing hardware. Moreover, some known software-based volume renderers attempt to achieve faster interactive rendering by skipping large portions of an image volume. In a sense, the rendering process is tuned to particular voxel values given a volume rendering opacity curve. Portions of a volume that would be transparent (i.e., those range voxels values that have been assigned an opacity of zero) are not sampled. This scheme does not allow a user to adjust an opacity curve while the user is interactively being shown results of the adjustment.

It would thus be desirable to provide an interactive volume rendering capable of operating on relatively inexpensive hardware. For at least some medical or surgical uses, it would also be desirable to provide interactive controls that have a rapid response to reduce the time required for analysis of images. It would additionally be desirable that the response be so rapid that an operator of imaging equipment could interactively emphasize important information within the volume while maintaining essentially instantaneous visual feedback to guide his or her selection. Preferably, such interactive "tweaking" or adjustment to initial, protocolized settings to extract relevant data should require no more than about one minute per examination. It would be desirable to spend much less time on 3-dimensional parameter adjustments and "tweaks" so that final, full-fidelity renderings can be started much sooner than is done using current systems. To further increase clinical productivity, it would also be desirable to eliminate significant complexity in user interfaces, and provide an intuitive approach for systems to quickly extract relevant data from a volume.

BRIEF SUMMARY OF THE INVENTION

One embodiment of the present invention is therefore a method for rapid extraction and visualization of relevant data from a volume of image data, the method including steps of rapidly producing reduced-fidelity images derived from an image volume, the reduced fidelity images having an adjustable visual parameter; adjusting the visual parameter of the reduced-fidelity images during the rapid production to select a desired adjustment; producing a full-fidelity image derived from the image volume; and applying the selected adjustment to the full-fidelity image.

This embodiment provides interactive volume rendering capability with relatively inexpensive hardware, with rapid response to reduce the time required for analysis of images.

DETAILED DESCRIPTION OF THE INVENTION

Figure 1:
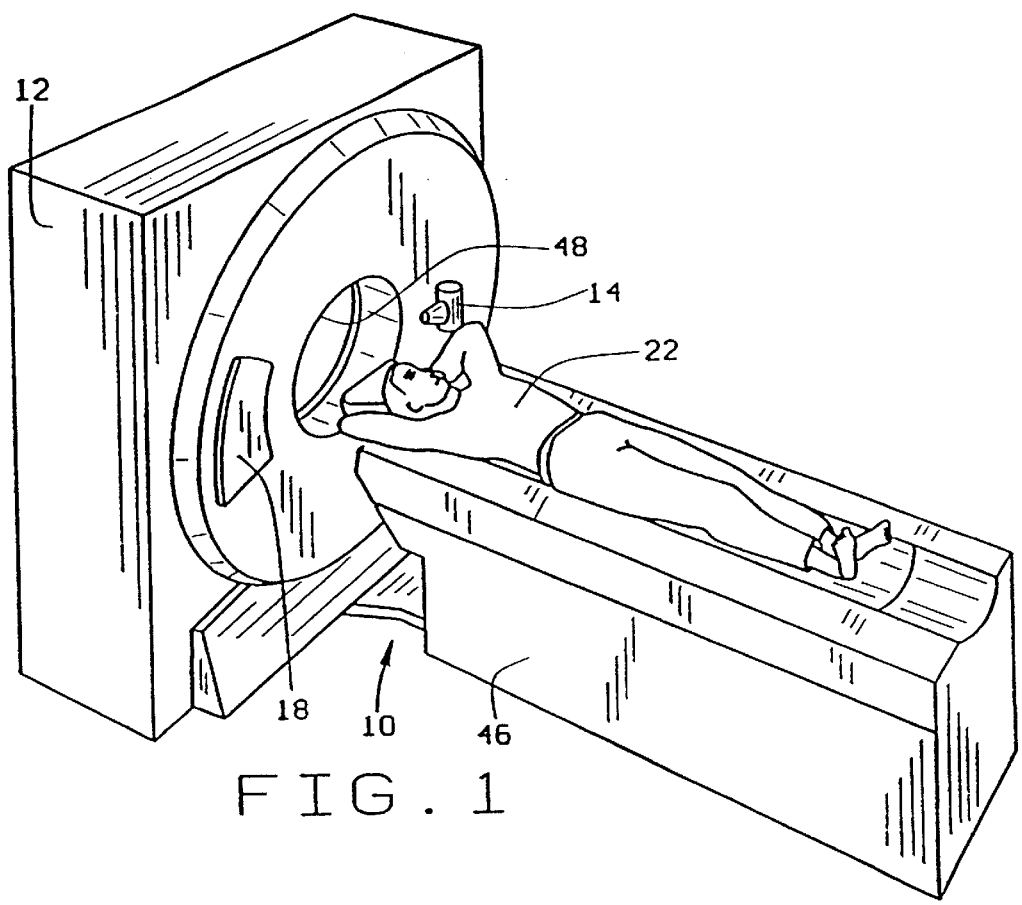
FIG. 1 is a pictorial view of a CT imaging system.
Figure 2:
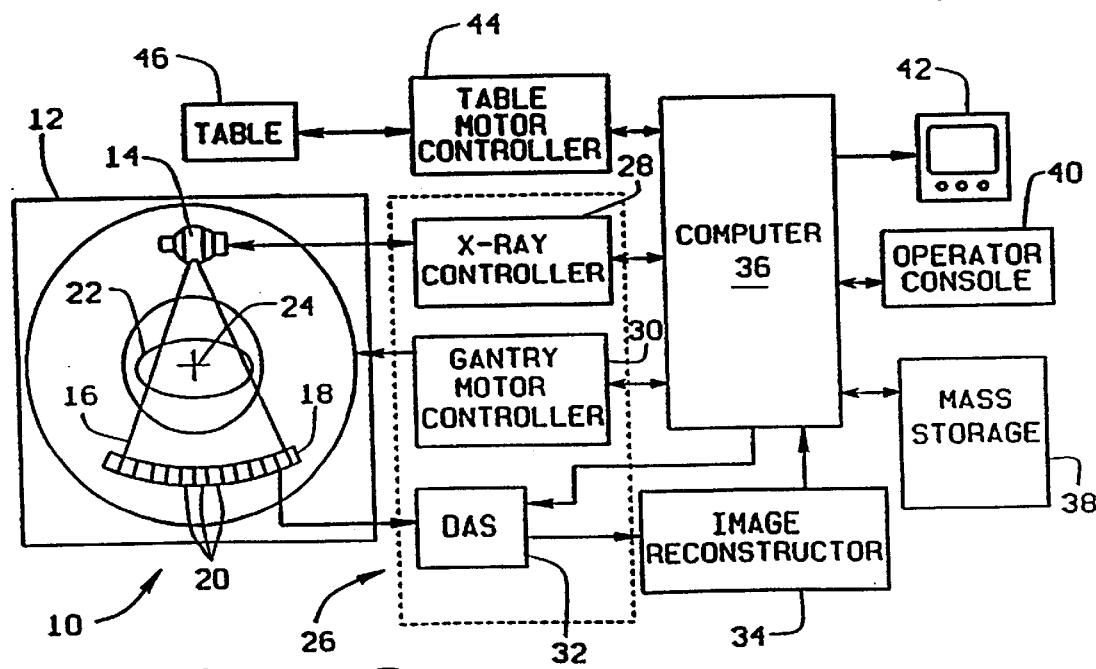
FIG. 2 is a block schematic diagram of the system shown in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
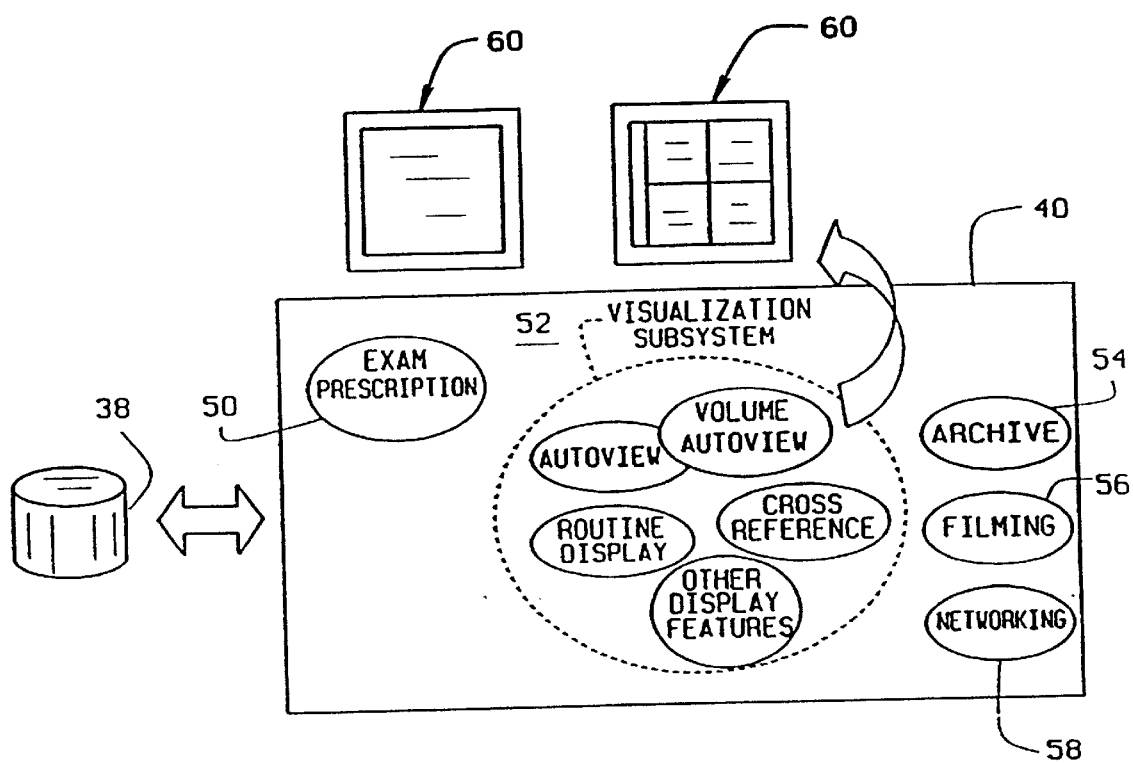
FIG. 3 is a block diagram of an operator console in accordance with one aspect of the present invention.

FIG. 3 is a block diagram of operator console 40. In accordance with one embodiment, computer 36 (FIG. 1) is integrated into console 40, and console 40 includes an exam prescription subsystem 50 which specifies the manner in which the imaging system acquires data, a visualization subsystem 52 responsible for the presentation layout and display of the acquired images and processed data, an archive subsystem 54 for permanent storage and future retrieval of imaging data, a filming subsystem 56 which transfers data onto film, and a networking subsystem 58 that transfers data via a network to or from other imaging systems. Optional remote viewing stations may be coupled to console 40 to enable the remote viewing of images.

Exam prescription subsystem 50 is responsible for determining how the patient exam data is acquired. Numerous parameters are required to specify an acquisition including a sequence of slice locations, slice thickness, field-of-view, scanning technique, and reconstruction algorithm. Volume imaging and filming presentation parameters may also be included in the exam scan prescription. These parameters can be entered explicitly by the technologist or, more commonly, the parameters are defined by selecting a particular scan protocol as is well known in the art. Subsystem 50 generates a scan prescription and the prescription is transmitted to DAS 32 (FIG. 2).

Figure 4:
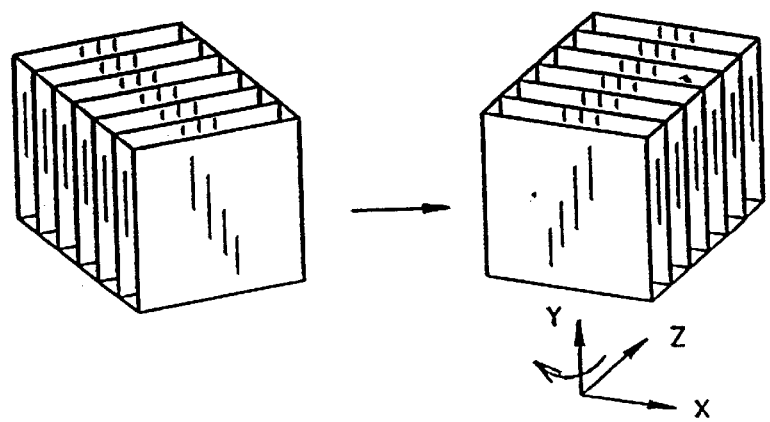
FIG. 4 illustrates rotation of a volume model.

DAS 32 collects the acquisition data in accordance with the prescription, and provides the acquired data to image reconstructor 34 for generating a series of images from the acquired data which can be used to produce a volumetric model. A volumetric model typically includes a three dimensional (or higher) rectilinear array of values, often with a single scalar value per sample. FIG. 4 illustrates a 3D rectilinear model which is constructed from a stack of two-dimensional images. During acquisition, individual slices are acquired and stacked along one dimension of the model. After all slices have been acquired and reconstructed a volumetric model containing Nx, by Ny by Nz, data samples is produced.

Referring again to FIG. 3, visualization subsystem 52 controls presentation of all relevant imaging data to the operator. The data includes, for example, 2D images, 3D projections, patient data, annotation, and measurements. Subsystem 52 implements several visualization features such as routine display, cross reference, autoview display, volume autoview display, and other forms of display, using one or more windows or viewports 60, where each window 60 may include its own set of visualization parameters. As described below in more detail, visualization subsystem 52 includes several components to filter, classify, render, annotate, and take measurements.

Archive subsystem 54 permanently stores (using various media formats) all imaging data, acquired and computed, for future retrieval. This data includes protocols, 2D images, measurements, and 3D renderings as screen captures. 3D protocols, movie clips, and cine loops may also be stored by subsystem 54.

Filming subsystem 56 generates a hard copy of the imaging data by processing the data to film. This may include 2D images, text and graphic annotations, and 3D renderings of acquired image data. Format and presentation parameters for 3D imaging, e.g., position, orientation, and transparency assignments) may be contained in the exam scan prescription.

Networking subsystem 58 is similar in functionality to archive subsystem 54 except that networking subsystem 58 transfers imaging data to or from another imaging system via a networked connection. Networking subsystem 58 can also accept HIS/RIS information and can provide state information for other subsystems. Examples of imaging data include 3D parameters, 3D projections, cine loops, and movie clips may be transferred to a networked workstation via networking subsystem 58.

Networking subsystem 58 may also establish a network connection to an auxiliary processing facility capable of performing view, image, and 3D processing. The auxiliary processing facility could include, for example, dedicated machines which quickly process the received data and return back image data and information. For example, reconstruction codes can be applied to the view data and a reconstructed data set is returned.

An optional remote viewing station subsystem may also be coupled to console 40. Such a subsystem would add the ability to remotely view real-time display updates of 3D images as the images are generated during acquisition.

Figure 5:
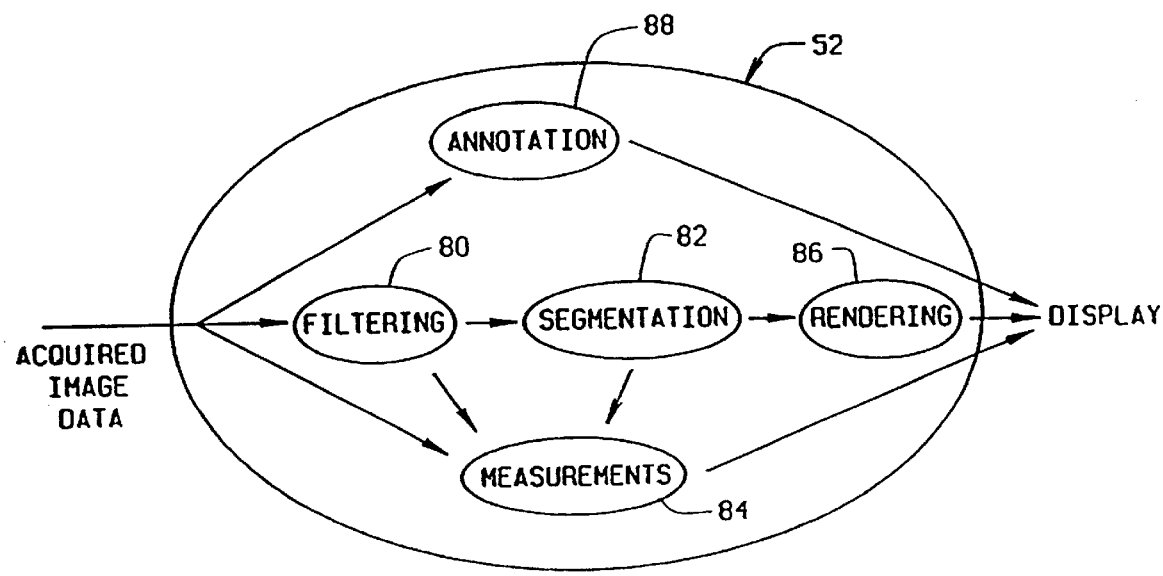
FIG. 5 is a block diagram of a visualization subsystem in accordance with one aspect of the present invention.

FIG. 5 is a block diagram of visualization subsystem 52. A filtering component 80 of subsystem 52 applies image processing filters to the data provided by DAS. Such filtering can include both two- and three-dimensional processing steps and is useful for image enhancement, image restoration or reduction of imaging artifacts, image compression and decompression, and preprocessing required for advanced visualization, as is well known in the art. Importantly, such filtering may occur incrementally during image acquisition. Such filtering can also be performed after the acquisition of a fully acquired data set. When not necessary, filtering component 80 may be bypassed, e.g., to increase processing speed.

Segmentation component 82 classifies the filtered data into separate categories. Component 82 may operate incrementally as the data is acquired, or it may operate after all the data has been acquired. Segmentation may include both two- and three-dimensional processing steps to provide information on how to extract the relevant information from the acquired imaging data. This information may have several forms, including lookup tables on image properties and separate volumes containing binary occupancy or material percentage information.

Measurements component 84 operates on 2D images and 3D volumes in either a realtime or post-acquisition mode. Measurement component 84 may perform calculations on the acquired image data, the filtered data, and/or the segmented data. Measurements include, but are not limited to, distance, surface area, volume, regions of interest (pixel or voxel means and standard deviations), and calcification scoring. As with other visualization components, these calculations may occur incrementally during acquisition or as a post-process.

Rendering component 86 obtains the output directly from image reconstructor 34 (FIG. 2), from filtering component 80, or from segmentation subsystem 82, and computes a new image to be displayed. Rendering component 86 can produce multiple rendered images of the acquired data in either a real-time mode or post-acquisition mode. Both modes support viewing of data as either a 2D cross section or as a higher dimensional projection of the model being acquired.

Annotation component 88 annotates patient and scanning information overlaid on the rendered image. Graphical annotation may also be provided in addition to text for features such as cross reference. Annotation can be applied to 3D renderings as well.

The parameters which govern subsystem 52 can be entered by the user prior to acquisition or included in the scan protocol. The parameters may also be locally adjustable during the acquisition.

Visualization subsystem 52 supports the real-time display of cross sectional data. This visualization feature is commonly referred to as "Autoview". "Volume Autoview", or "VAV," as used herein, refers to an incrementally updated 3D view of the data as the data is being acquired. Volume Autoview attaches to the imaging "stream" from the image reconstructor and is executed at console 40.

During data acquisition, Volume Autoview provides a real-time, incrementally updated, 3D view of the data as the data is acquired over time. This method of rendering is referred to herein as dynamic data rendering (DDR). After the data has been completely acquired, a method of rendering for static data is then utilized. This method of display is referred to herein as static data rendering (SDR). In addition, the capability to render both static data and dynamic data within an integrated view is provided. This type of rendering is referred to as mixed data rendering (MDR). DDR, SDR, and MDR are described below in more detail.

Prior to data acquisition, an exam is prescribed by the technologist. Volume Autoview is integrated with the exam prescription subsystem, providing new parameters which specify how the dynamic volume(s) should be visualized during the acquisition. More particularly, parameters such as position and orientation of the 3D model and view, color and transparency assignments, filter and segmentation settings, visualization technique and algorithm are specified in the protocol. The visualization parameters are also contained in specific VIS scan protocols. Filming can also be prescribed prior to acquisition as well as the generation and archival of movie clips.

As new images are acquired, visualization subsystem 52 filters the images (if necessary) as they are added to the 3D model. Two- and three-dimensional segmentation is also possible for extracting specific information from the images with the constraint that all processing and rendering must "keep pace" with the image generation rates of acquisition subsystem, even with very fast, interventional ("fluoro") scanning modes. Volume Autoview also can be utilized to obtain real time measurements (e.g., volumes of interest, and calcification scoring) on the dynamic volume.

Volume Autoview can be performed in a "rock mode". More specifically, a small rotation angle can be applied to the 3D model, typically about the vertical axis and normal to the viewing vector. The rotation angle varies cyclically as the 3D model is rendered from frame to frame. Such automatic rotation is not only useful in providing another depth cue in the 3D visualization process, but is especially valuable for interventional procedures in which the technologist/radiologist/interventionalist may not have hands free to interact with the 3D model during the acquisition. The rock mode parameters can be included in the prescription, and also can be adjusted by the user.

Volume Autoview also includes intermixing geometry data with volume data. For example, a geometric model of a needle can be embedded into the volume, and Volume Autoview can be utilized to track the position of the actual needle used in a biopsy procedure. Embedded geometry can also be used as three dimensional annotations within the volume.

Multiple imaging windows, or viewports, 60 (FIG. 3) also can be used for independent visualization parameters. For example, during an acquisition, bone structure from a sagital view can be displayed in one window while vasculature from a coronal view can be displayed in a second window. Multiple viewports, each with an independent set of visualization parameters, are provided.

A significant clinical benefit of Volume Autoview may be in the treatment of trauma cases. In such emergency situations, minimizing the total study time is critical. Due to the time constraints, the radiologist may forgo the traditional 3D post acquisition analysis, and rely solely on the information conveyed from the cross sectional data. With Volume Autoview, the radiologist is presented with additional 3D information during the acquisition without a time penalty which may be essential in making the proper diagnosis.

Figure 6:
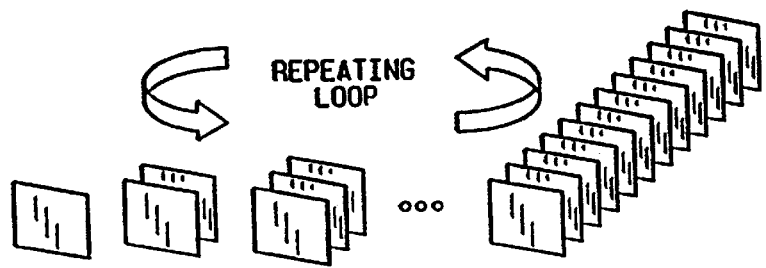
FIG. 6 illustrates replay of an incremental update of an acquired volume of data.

Following acquisition, a review display mode may be utilized to interact with and to further visualize the volume of data, e.g., to extract additional information from the volume. Using a playback feature, renderings of the visualized volume may be output to a VCR. A repeat loop can also be employed, as shown in FIG. 6, which replays the volume as it was being acquired. Multimedia movie clips can also be generated and archived for later replay.

Figure 7:
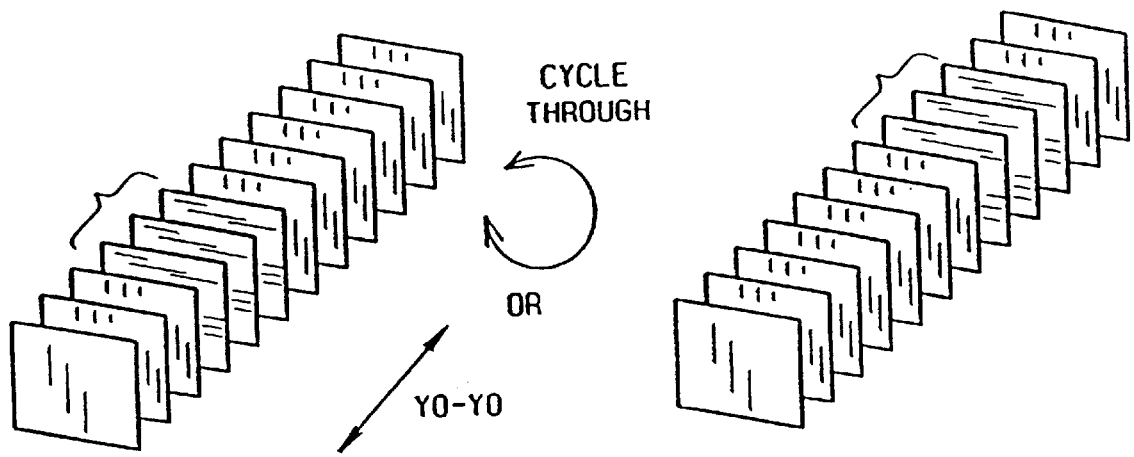
FIG. 7 illustrates playback viewing options.

Referring to FIG. 7, the volume can be cycled through for visualizing a slab, or sub-volume, (e.g., slab cine/paging) of the data at a time. In addition, any 3D renderings can be installed into the image database, archived, filmed, or networked.

Rendering subsystem 86 operates on at least one volumetric model. A virtual camera model is defined to specify the parameters for projecting a volumetric model onto an image plane which is decomposed into Px by Py pixels. The camera model utilizes a projection matrix M that defines the mapping from the camera view coordinates to the model data sample coordinates. This matrix accounts for the aspect ratio of the samples in the volume and all transformations (e.g., scaling, translation, and rotation) on the volumetric object and the camera. The matrix M supports common projection techniques including parallel and perspective viewing transformations.

The projection of the volumetric model onto the image plane is accomplished using, for example, ray casting or texture mapping. Of course, other image ordering techniques can be used. The image order technique known as ray casting (RC) casts a ray from each pixel in the image plane into the volume. The volume is then sampled along the ray and data values are combined to form a final pixel for the image. Samples may optionally be mapped to various quantities, such as color or opacity, to support common volume rendering techniques. Common operations applied to samples along the ray are maximum intensity (MIP), average, compositing, and compositing with shading.

Alternatively, a hardware texture mapping (TM) technique may be used. Hardware TM is an object order technique wherein data samples are traversed and blended in the proper order using texture mapped geometric rendering hardware. The samples (or their RGBA mapped values) are mapped onto polygons and the polygons are projected onto the image plane. Depending on the TM hardware, the planes projected may be either axis aligned (2D TM hardware) or oblique and parallel to the camera view plane (3D TM hardware). Similar to RC, the data samples may be converted to other properties, such as color and opacity, to support common volume visualization rendering techniques. All operations on samples available in RC are possible using a TM technique. Both RC and TM techniques, which are well known, may be used to support the three rendering modes described below.

Figure 8:
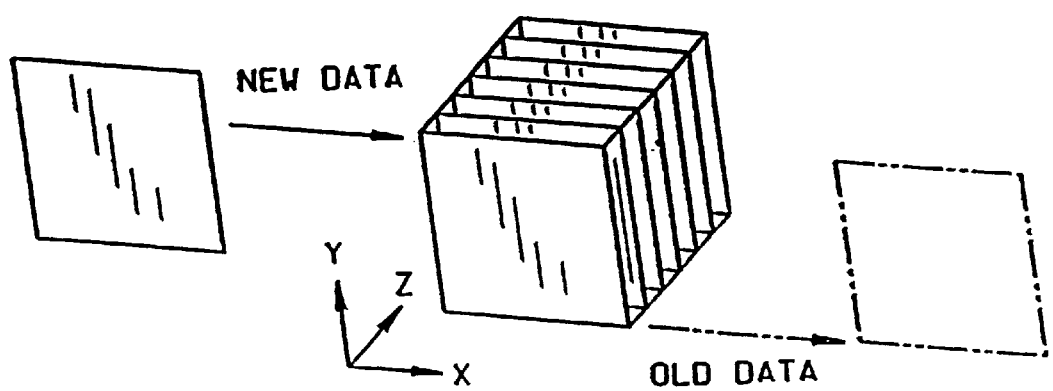
FIG. 8 illustrates rendering of dynamic data.

When the volume model to be rendered changes over time, the rendering process needs to account for these changes in the next rendered image. FIG. 8 illustrates a volume model in which a slice has been replaced with new data. With this type of change, rendering can be performed in two ways. A simple brute-force strategy to rendering is to completely render all the data acquired thus far to produce an up-to date image. However, substantial computational savings can be obtained if the camera and volumetric model remain stationary. In this case, it is possible to incrementally update a previous rendering to account for a change in the volume data.

Figure 9:
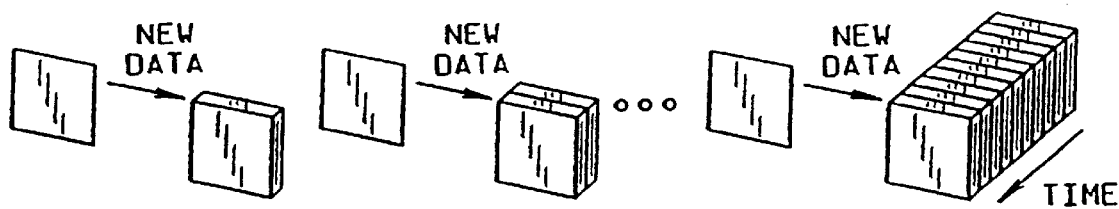
FIG. 9 illustrates incremental update of data.

Using TM, for example, a new rendering is achieved by adding the contribution of each new slice to the previously computed image. FIG. 9 illustrates the volume increasing in size toward the viewer as new slices are added to one end of the volume. When a new slice is available, and using the DDR method, all texture mapped polygons between the last slice and the new one are utilized. The texture mapped polygons containing the colors and opacities of the new slice are transformed through the inverse projection matrix M−1, scan converted, and blended with the current image in the frame buffer. The newly added slice may be added to either the front or the back of the volume with respect to the viewer. Adding the slice in front of the already rendered slices is desirable since it allows the user to view the latest acquired information and, when compositing, it requires no additional memory in the frame buffer for storing partial opacity results. Adding slices behind the previously rendered slices requires the use of front-to-back compositing and therefore requires additional memory per pixel.

If shading is being performed, the computed normals of the previously rendered slice need to be modified. The contribution of the previous slice, however, is already blended in to the current image. Rendering could be delayed by one or more slices so that all information for that slice is available when its contribution is made to the rendered image.

The computational complexity of rendering a volume model with the brute-force incremental approach is O(N), where N is the number of planes in the volume. An incremental approach to rendering reduces the computational complexity of rendering to O(1), since only 1 additional slice needs to be rendered for each slice added to the volume model.

With incremental rendering, the only change that is supported between renders is the addition of data at the volume model boundary. Also, the orientation of the volume model with respect to the camera image plane must be such that the absolute value of the angle between a slice normal and the image plane normal is within 90 degrees. That is, the camera must be viewing the volume predominantly through the axial slices.

A RC approach to incremental rendering functions in much the same way as the TM approach, but with fewer restrictions. Before any renderings of the volume are made, and for every pixel in the rendered image, ray definitions are stored for every pixel in the volume. When a new slice is added to the volume model, those rays that are immediately affected are determined and, for each one, the contribution of the new slice is calculated. With this approach, there is no restriction on the viewing angle of the volume model. Similar to TM, the computational complexity for adding a new slice to the volume is a constant.

Figure 10:
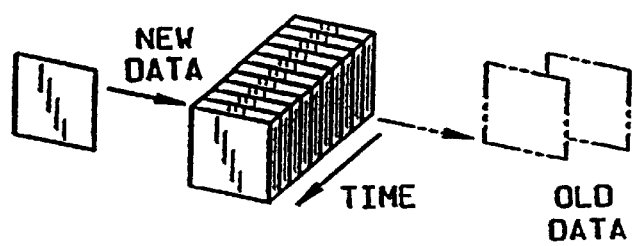
FIG. 10 illustrates a sliding window of dynamic data rendering.

It is often desirable to show the last N slices acquired during scanning. This display type is referred to as a sliding window technique. FIG. 10 illustrates that as scanning progresses, slices are added and removed from the model.

One method for rendering a sliding window model would reconstruct and render an entirely new volume when each new slice is scanned. Similar to incremental rendering, a sliding window rendering technique can take advantage of previous rendering results if the camera view with respect to the volume model is fixed.

Figure 11:
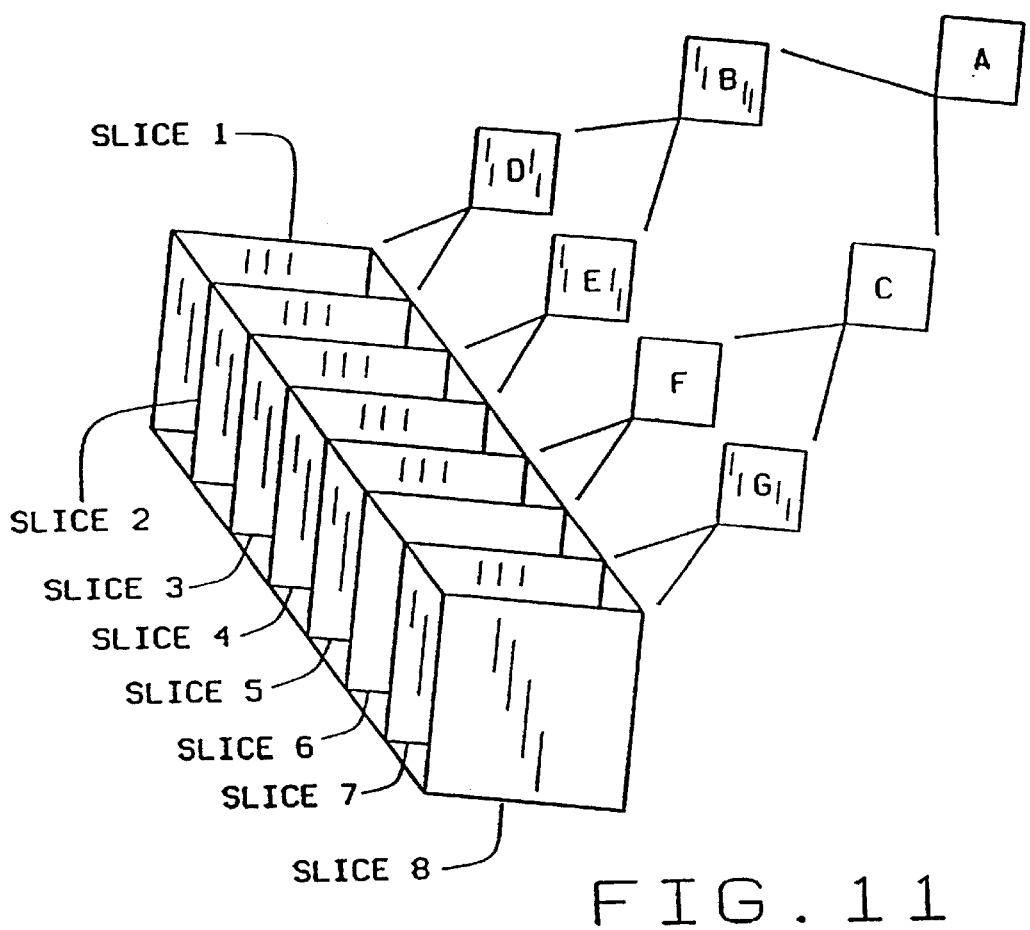
FIG. 11 illustrates a hierarchical data structure.

To efficiently render a volume model after a change has been made to a slice, a hierarchical data structure may be utilized. The hierarchical data structure is in the form of a binary tree, where the leaf nodes are the original slices and the internal nodes are the images produced when rendering pairs of slices. FIG. 11 illustrates a tree produced from the 8 original slices. Node F contains the image produced (typically the color (R,G,B) and opacity (A) for each pixel) when just slices 5 and 6 are projected onto the camera view plane. Node C contains the image produced when nodes F and G are projected and therefore also represent the projection of slices 5 to 8. Nodes A–G store an image of the partial results of rendering the entire volume model. These projected images are the same size as the camera view plane size, which is Px, by Py pixels.

When a change is made to a slice, such rendering recombines all nodes that could be affected by that change. As shown in FIG. 11, slice 6 has changed and therefore the images at nodes F, C, and A need to be recomputed. This technique effectively reduces the computational complexity of rendering a single slice change to a volume from O(N) to O(log(N)), where N is the number of slices in the volume model.

Alternatively, each leaf of the tree may represent a plane of samples which are not necessarily located on an original slice. A form of interpolation, such as trilinear interpolation, can be used to compute the sample values. If a single original slice of a volume model is modified it will have an effect on any samples that take place within the 1 slice region around it. In this case, multiple leaves of the tree will change and there is a possibility that more nodes will need to be processed to compute a new image.

FIG. 11 illustrates a case in which the slice being changed is inside the previously rendered model. If the slice is being added or removed from the model, the hierarchical data structure will need to change to account for the addition. If slice 9 is added to the volume model, a new node H will be inserted into the tree at the same level as G. Supporting nodes will also be built and the resulting tree will be temporarily unbalanced.

The sliding window rendering method can also be realized with RC. Each ray cast builds a hierarchical data structure storing partial results for pairs of samples along the ray. If a change occurs along the ray, the partial results can be efficiently recombined to build a new rendering.

The hierarchical rendering described above is applicable to a wide range of scanning methods. The method supports efficient rendering of any change within a volumetric model. For instance, when scanning freehand with an ultrasound probe, any plane cutting through the model can be acquired and updated. This hierarchical rendering method supports the efficient rendering of these arbitrary updates.

As data is being acquired, all information necessary for post-processing visualization is incrementally computed. When the scanning system has acquired a full volume, the model may then be visualized using standard volume visualization techniques, such as TM or RC. The operator may immediately review the scanned data in a three dimensional display.

A volume model often contains more than just a collection of slices. Gradient information at each location is typically computed in addition to segmentation volumes. It is advantageous to precompute this information since calculating it during rendering is extremely time consuming and computationally expensive. The construction of these additional data structures can be performed incrementally during scanning if sufficient computing resources are available.

Figure 12:
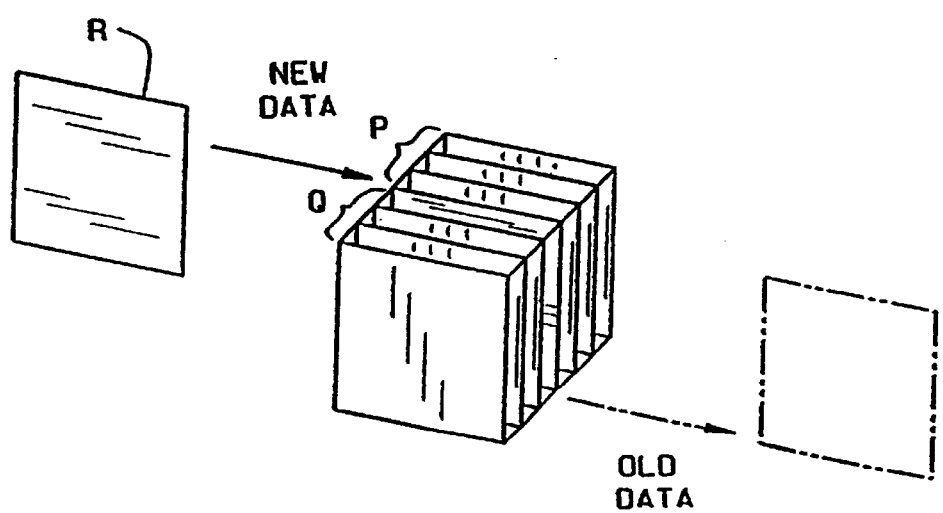
FIG. 12 illustrates mixed data rendering.

Mixed data rendering (MDR) combines both a static, previously acquired, volume model with dynamic data. FIG. 12 illustrates a volume model in which all slices are static except for one. The dynamic slice is continuously changing as the scanner acquires new information on that plane. Rendering this type of mixed data can be achieved with either a brute-force, i.e., render the entire volume each time, approach or with fixed view rendering variants. For the situation illustrated in FIG. 12, an image P of all slices projected before the dynamic slice, as well as an image Q of all slices projected after the dynamic slice, can be stored. When a new dynamic slice R is acquired, rendering simplifies to combining image P, then the projection of the dynamic slice, and finally the image Q.

MDR is potentially useful in a CT fluoroscopy setting, for example, where a previously acquired scan can indicate the presence of important anatomy in front of and behind the acquisition area. This capability can, for instance, present an interventional radiologist with visual information on the 3D location and structure of nearby ribs as a needle biopsy is performed.

The above described volume imaging system progressively constructs, analyzes, and updates three dimensional models while cross-sectional data (not limited to but including axial cross-sectional data) is being acquired. The system constructs and displays three-dimensional renderings, and performs quantitative calculations in real time during the imaging system data collection process, displays interactive three-dimensional renderings in a traditional post-data collection process, as well as prescribes, archives, films, and transmits rendering procedures, parameters, renderings, measurements, and processed data, during data collection and post-acquisition.

The above described rendering techniques are applicable to any type of scanning modes, including single slice scanning and volumetric scanning modes. For volumetric scanning, the acquired imaging data stream simply includes a collection of 3D images.

To provide more immediate feedback in medical or surgical environments, one embodiment of visualization subsystem 52 provides rapid response, interactive volume rendering using relatively inexpensive hardware. This embodiment provides a response time rapid enough to allow an operator to make interactive adjustments to emphasize important information within the volume while maintaining essentially instantaneous visual feedback to guide his or her selection.

In one embodiment of the present invention, a 3D rendering that achieves highly interactive rendering performance on a modest graphics workstation (e.g., a medical imaging scanner console or analysis/review workstation) is provided. This embodiment utilizes an intuitive volume visualization application that utilizes a set of VR presets, specified by a study protocol, coupled with non-complex VR curve and volume clipping controls that provide real-time feedback.

Interactive rendering rates are achieved using one or more of several different techniques. The first technique is volume decimation, which achieves increased efficiency by rendering a smaller version of an image data volume during interaction. For example, ¼×¼×½ of a full volume is rendered, instead of the full volume. The second technique is to reduce the size of the render matrix used. For example, a rendering matrix of 256×256 data points is zoomed (e.g., using bilinear interpolation) during interactive rendering to a 512×512 rendering in a visible viewport. Finally, when sampling three dimensional textures, the coarseness of the sampling and/or polygon step size is increased. For example, ½ sampling is used, which doubles a distance between sampling planes.

In this embodiment, visual substation 52 comprises a graphics workstation. One example of a graphics workstation having sufficient power to comfortably achieve the highly interactive rendering performance desired for the present invention is an SGI® Octane® workstation (available from Silicon Graphics, Inc., Mountain View, Calif.) having a 275 MHz MIPS® R12000® CPU (MIPS Technologies, Inc., Mountain View, Calif.), 1024 MB RAM, 32K instruction cache, 32K data cache, 2 MB secondary cache, and SGI® "SI with texture option" graphics hardware. For a typical medical image data set comprising 200 slices of 512×512 image data, this embodiment had a typical interactive rendering time of 0.15 to 0.20 seconds. Other embodiments use workstations having greater or lesser performance. Substantially less powerful workstations may have difficulty achieving a desired degree of highly interactive rendering performance, however.

Figure 13:
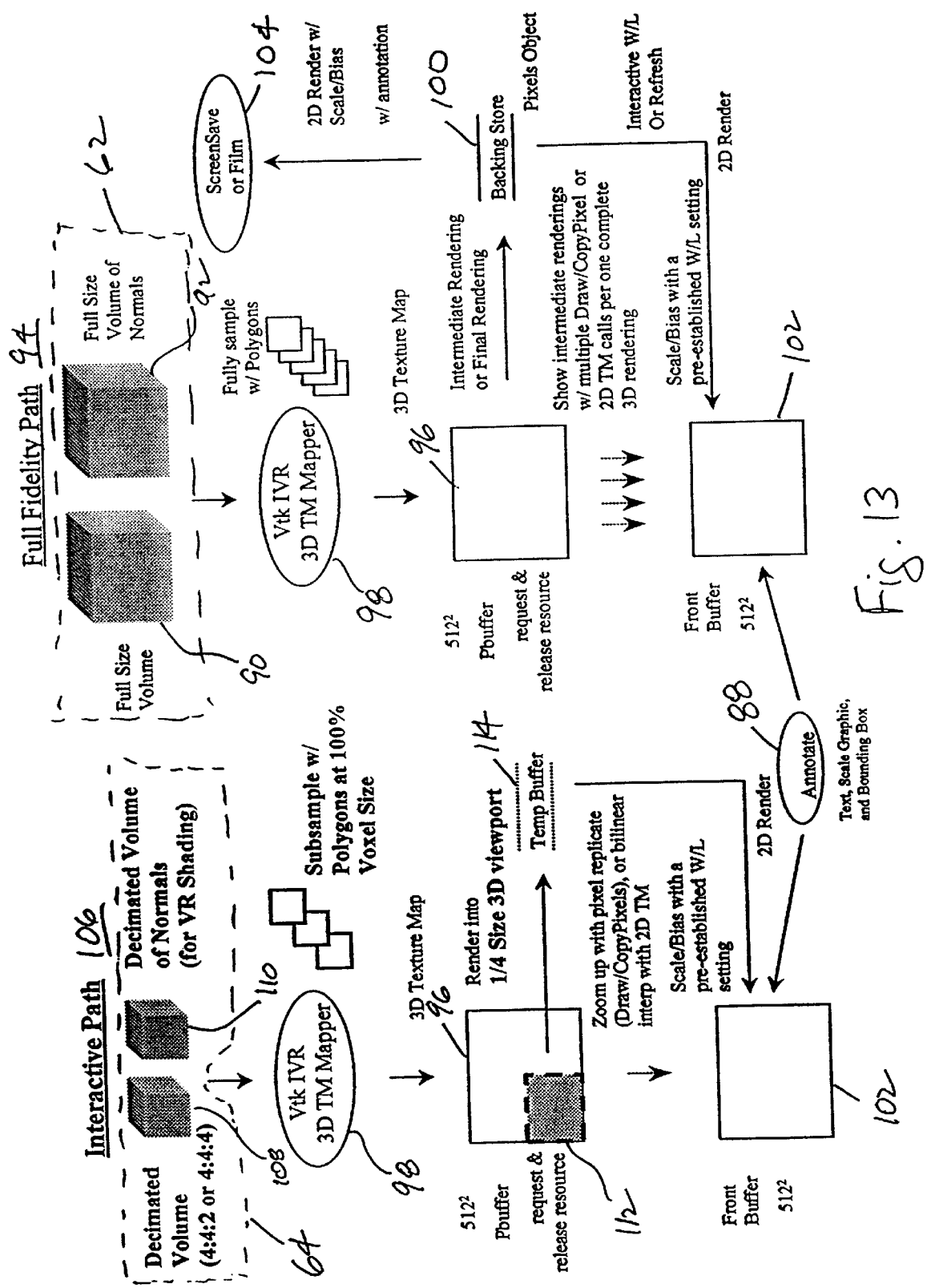
FIG. 13 illustrates two data processing paths, including a reduced-fidelity interactive path, for rendering data.

Referring to FIG. 13, a volume of image data 62, comprising both a full-size volume of voxels 90 and a full size volume of normals 92 (for VR shading) are used in a full-fidelity rendering path 94 to produce a full-fidelity image derived from volume 62. Rendering component 86 (not shown in FIG. 13) fully samples voxel volume 90 and normal volume 92 using a three dimensional texture mapping to map volume 90 onto specified polygons. These mapping results are composited into a full-size 512×512 buffer 96 containing a matrix of intermediate 3D results. Software 98 is based on common TM techniques, but the techniques are modified to support both interactive and full-fidelity rendering by handling different size volumes (full and decimated), different size 3D rendering matrices (e.g., 512×512 and 256×256) and a variable polygon step size (e.g., 100%, or, as used in one embodiment, 50%).

Buffer 96 is used by rendering component 86 for intermediate or final rendering into pixels that are stored in backing store 100. The intermediate renderings are shown with multiple Draw/CopyPixel or two dimensional TM calls per complete three dimensional rendering on 3D viewport 102, which is a 512×512 buffer coupled to a display. Annotation component 88 is used when it is desired to provide annotations on renderings. Intermediate and/or final renderings are saved, with annotations (if provided) 104 using screen saves or film.

A second, interactive path 106 is also provided for reduced-fidelity, rapid rendering of an image volume. Path 106 produces images more rapidly and with less fidelity than does rendering path 94. A decimated volume of image data 64 comprising a decimated volume of voxels 108 and a decimated volume of normals 110 (for VR shading) is derived from imaging volume 62 by visualization subsystem 52 by decimating voxel volume 90 and normal volume 92 of image volume 62. Three dimensional textures formed from volumes 108 and 110 are mapped using polygons at 100% voxel size spacing into a ¼ size (256×256) render matrix 112 contained in buffer 96. (In other embodiments, a different size render matrix 112 is used, but one that is smaller than that of full fidelity rendering path 94, and hence only a portion 112 less than the entirety of buffer 96 is used.) The intermediate rendering stored in render matrix 112 represents a 3D volume rendering of decimated image volume 64. Render matrix 112 is read back into a same size temporary buffer 114, and is zoomed up to 512×512 using, for example, pixel replication or bilinear interpolation with two dimensional TM rendering (if bilinear interpolation is used) to display in 3D viewport 102. Annotation component 88 is used when it is desired to provide annotations on these renderings. In one embodiment, the decimated image volume is sampled with spaced polygons at a first spacing to rapidly produce a reduced-fidelity image, and the full-size (i.e., undecimated) image volume is sampled with spaced polygons at a second spacing. The first spacing is more widely spaced than the second spacing.

Figure 14:
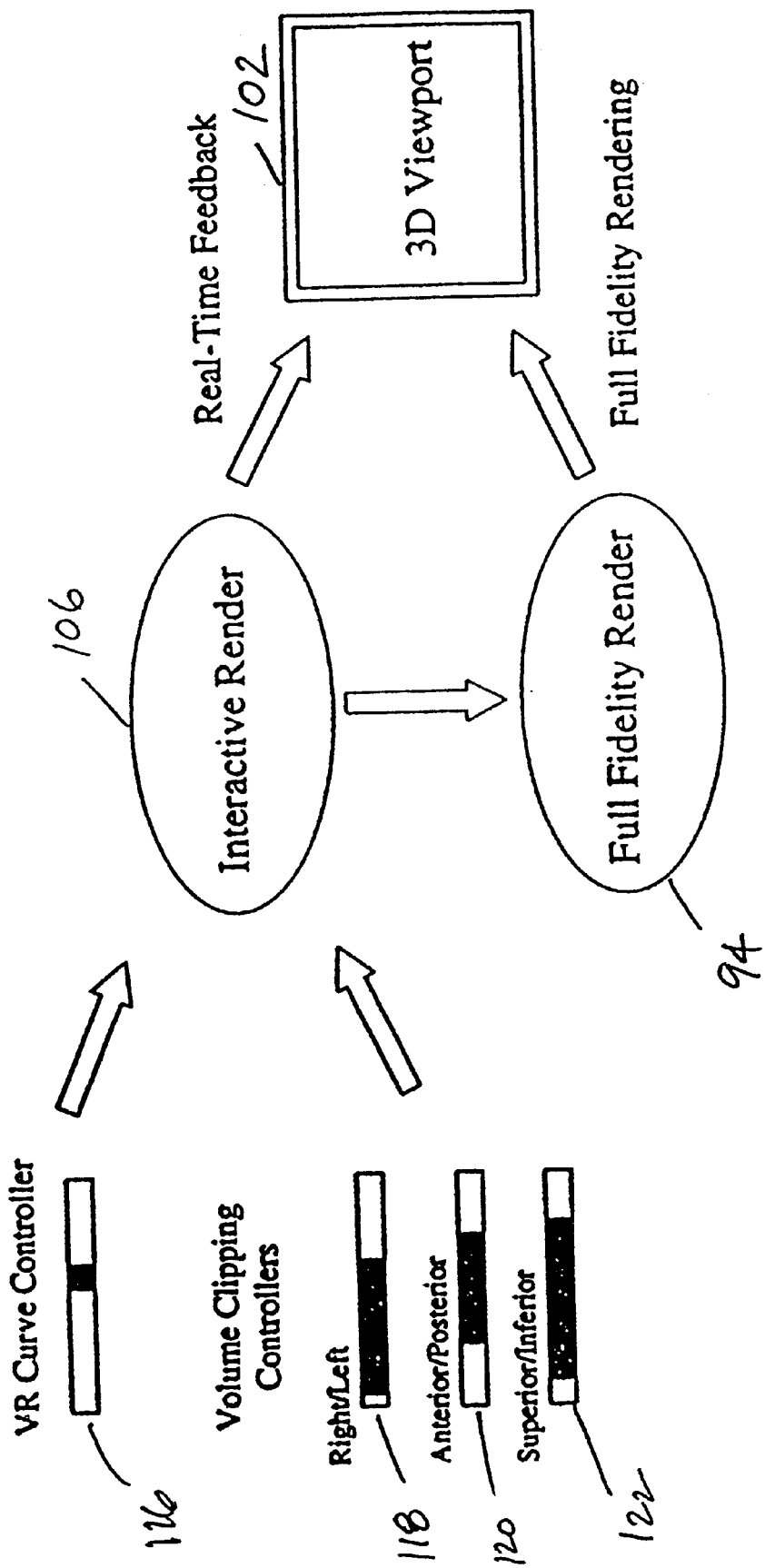
FIG. 14 illustrates a group of sliding controls used in one embodiment of the invention to control an adjustable image parameter during rapid rendering to select a desired adjustment, and which displays its results into a 3D viewport.

Referring to FIG. 14, a simple VR curve controller 116 and clipping controllers 118, 120, 122 with real-time feedback are provided, resulting in a simple, intuitive user interface. Controllers 116, 118, 120, and 122, in one embodiment, are virtual controls provided on a display screen (not shown) of visualization subsystem 52 and manipulated with[]a mouse or keyboard. Histograms, thresholds, and cut-lines are avoided, thereby eliminating the complexity of cross reference images. As a result, necessary adjustments to initial visualization parameter presets are made much more quickly to extract relevant information from a volume. Adjustments of at least one visual parameter determined through the use of interactive, reduced fidelity rendering path 106 select a desired adjustment to be applied to a full-fidelity rendering. In one embodiment, the full-fidelity rendering path renders a full-fidelity image of image volume 90, and the selected adjustment is applied to the full-fidelity image and displayed in 3-D viewport 102. Increased productivity and workflow in the clinical environment are thus provided.

Figure 15:
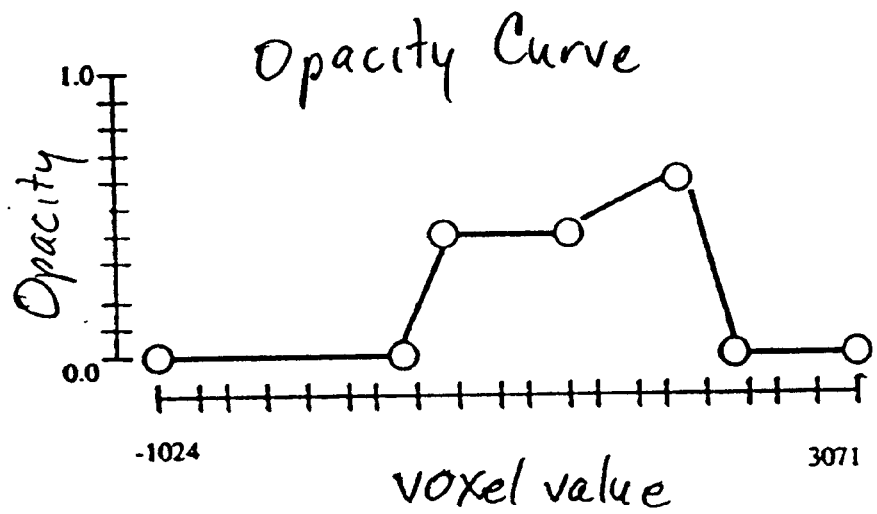
FIGS. 15 and 16 illustrate a horizontal translation of a VR curve.
Figure 16:
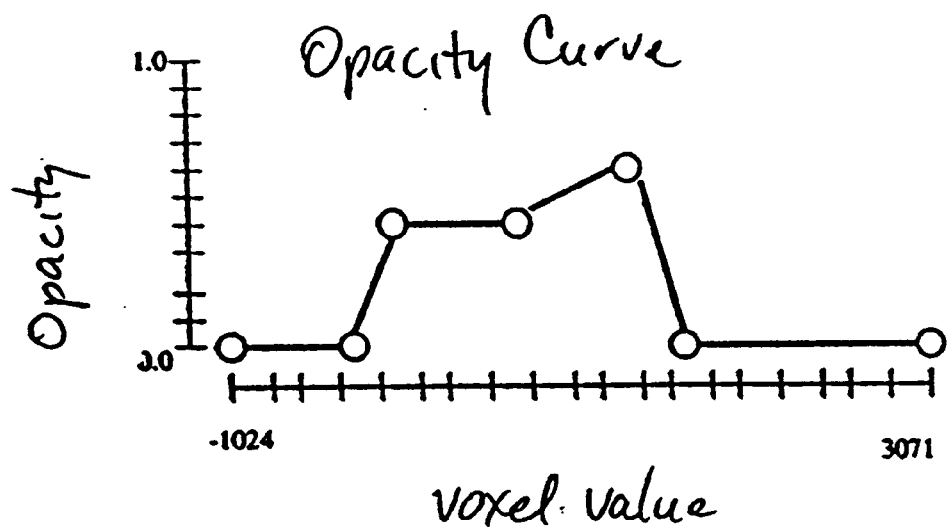
Figure 17:
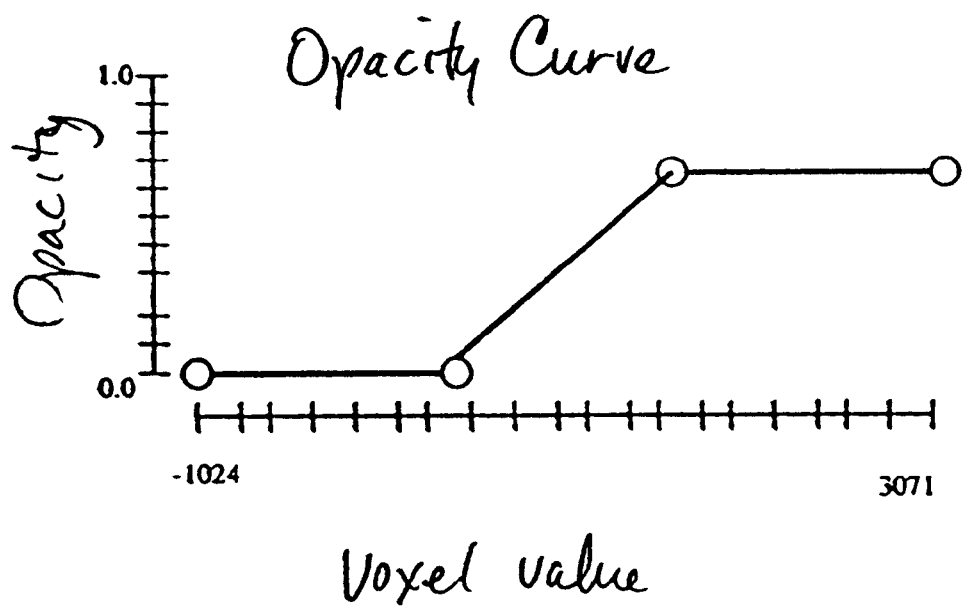
FIGS. 17 and 18 illustrate a change in slope of an up-ramp of a VR curve.
Figure 18:
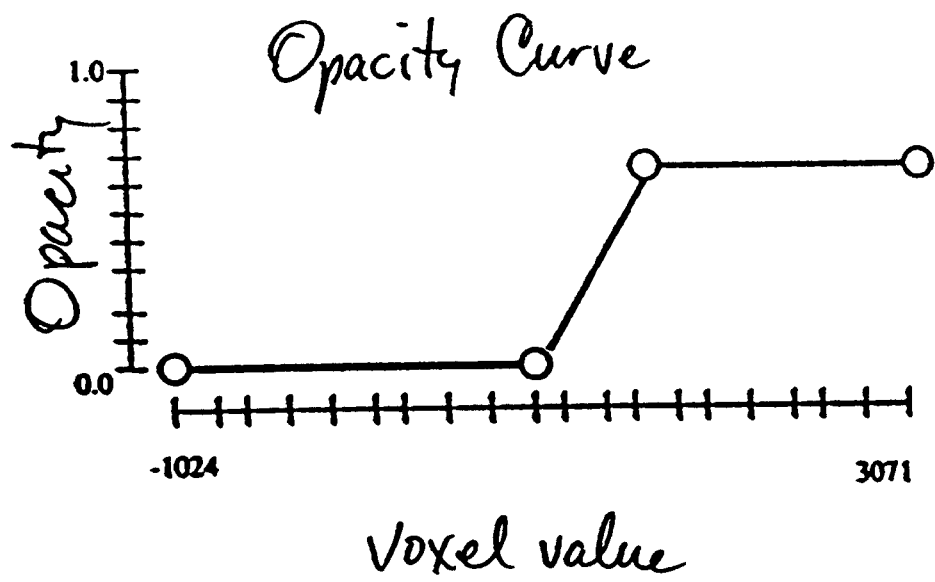

A "one-knob" single control 116 for VR curve adjustments is used in one embodiment of the present invention. Adjustments of the controller result, for example, in horizontal or vertical translations of curve points as shown in FIGS. 15 and 16, or in a change in slope between adjacent points as shown in FIGS. 17 and 18. The specific operation and adjustment performed by controller 116 is defined by a VR preset in each embodiment, but none of the details need be exposed to the user. An analogy could be made to old style radio tuners where the VR preset corresponds to a radio tuner preset key while the one-knob VR curve controller in analogous to the radio fine tuner.

In one exemplary embodiment illustrated in FIGS. 15 and 16, adjustments to VR curve controller 116 map into horizontal translation of internal curve points by some fixed increment. In this embodiment, voxels within a certain range (or in accordance with an arbitrary, specified function) are assigned opacities in a manner that emphasizes those voxels and de-emphasizes or hides other voxels. The location of this range is varied, depending on the adjustments made to VR curve controller 116. Such an adjustment could be used, for example, to emphasize vessels while de-emphasizing bone and other tissues.

In another exemplary embodiment shown in FIGS. 17 and 18, adjustments to VR curve controller 116 map into change in the slope of an up-ramp, in effect, providing a 3D window-leveling capability. In yet another embodiment, VR curve controller 116 has more than one function, the function being interactively selectable. In addition, the VR curve controller need not be implemented with the GUI slider. In one embodiment, it is controlled by mouse drags within the 3D viewport.

Thus, in one embodiment, and referring to FIGS. 15 and 16, the decimated image volume is interactively reconstructed while a relationship between opacity and voxel value is adjusted from a preset level. (In a CT imaging system, voxel values are equivalent to Houndsfeld units.) More particularly, in this embodiment, the relationship between opacity and voxel value assigns higher opacity values for a selected range of voxel values. The adjustment of the relationship between opacity and voxel value thus involves changing a range of voxel values to which the higher values of opacity are assigned in response to a user-operated control 116. Thus, opacity is an adjustable visual parameter in this embodiment. (It is considered equivalent to change a range of voxel values at which lower opacity values are provided, as this change also must occur. See FIGS. 15 and 16.) In another embodiment, and referring to FIGS. 17 and 18, the relationship between opacity and voxel values provides a cut-off slope within a selected range of voxel values, and a relationship between opacity and voxel values is adjusted by changing a range of opacities in which the cut-off slope is provided in response to a user-operated control 116.

Figure 19:
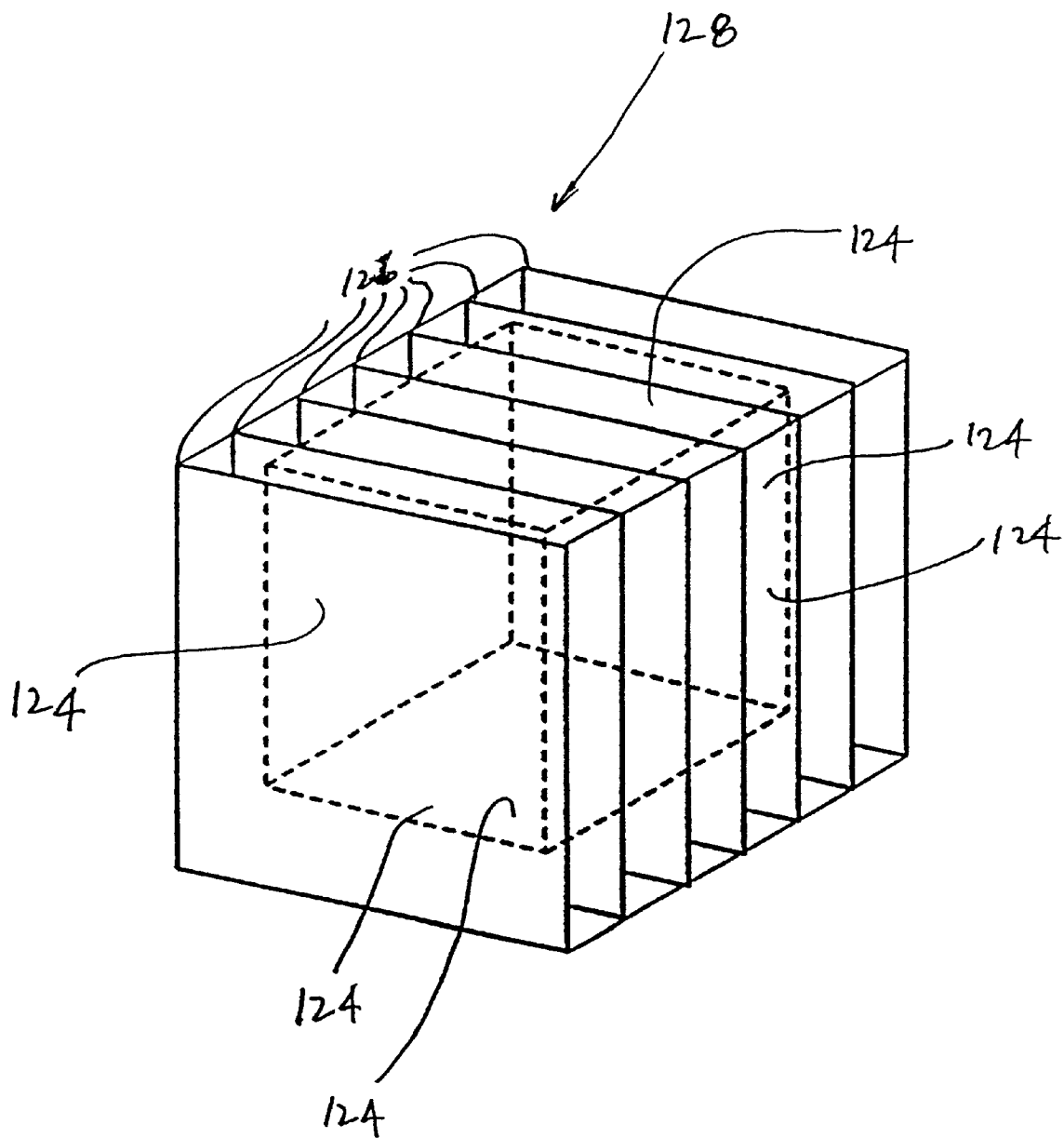
FIG. 19 illustrates a volume of interest defined by locations of clipping planes within an entire image volume.

In one embodiment, and referring again to FIG. 14, intuitive slider controls 118, 120, 122 are provided for each of the right/left, anterior/posterior, and superior/inferior volume clipping planes respectively. Referring to FIG. 19, these controls operate to interactively adjust locations of clipping planes 124 that define a subvolume or volume of interest (VOI) within a stack of images 126 that make up an entire image volume 128. Thus, there is selectively provided a set of volume clipping planes 124 which define a volume of interest (VOI), and the volume clipping planes are selected in accordance with an adjustment of sliding controls 118, 120, and 122. In this embodiment, the user-defined VOI is an adjustable visual parameter.

Interactive "tweaking" or adjustment to extract relevant data, in one embodiment utilizing the SGI workstation, requires one minute or less per examination.

In an embodiment that utilizes a software-only ray casting approach, similar techniques are used to achieve interactive volume rendering rates. In this embodiment, the volume is significantly subsampled and rendered into a smaller render matrix which is then zoomed up. In another embodiment utilizing the software-only ray casting approach, a "nearest-neighbor" sampling scheme is used during interactive rendering to avoid the computational cost of tri-linear interpolation that is inherent in full-fidelity renderings. A smaller, decimated version of the image volume may also be used in some embodiments to achieve interactive rendering images. In one embodiment, either or both of the interactive and full-fidelity rendering processes are multi-threaded to take advantage of additional processing power on a multiprocessing computer system.

It will thus be apparent that embodiments of the present invention provide solutions to problems of known systems for rendering volumes of image data. Embodiments of the invention described herein, for example, provide interactive volume rendering using relatively inexpensive hardware. Some of the embodiments described herein provide interactive controls with rapid response to reduce time needed for analysis of images. In some embodiments, response sufficiently rapid is provided so that interactive emphasizing of important information can be accomplished while maintaining essentially instantaneous visual feedback. In addition, significant complexity in user interfaces is reduced, and an intuitive approach is provided for quickly extracting relevant data from a volume. A constant level of interactive rendering performance can be achieved regardless of the voxel values in an image volume or a current setting of the rendering opacity curve of the image volume. Thus, simple user interface controls such as opacity and clipping plane controls can be provided with a smooth and steady rate of feedback.

While the invention has been described in terms of various specific embodiments, those skilled in the art will recognize that the invention can be practiced with modification within the spirit and scope of the claims.

What is claimed is:

1. A method for rapid extraction and visualization of relevant data from a volume of image data comprising the steps of:
   rapidly producing reduced-fidelity images derived from an image volume, the reduced fidelity images having an adjustable visual parameter, when rapidly producing reduced fidelity images derived from an image volume comprises the steps of decimating a full-size image volume to produce a decimated image volume and reconstructing the decimated image volume, wherein opacity is the adjustable visual parameter and reconstructing the decimated image volume comprises the step of adjusting a relationship between opacity and voxel value from a preset level, wherein the relationship between opacity and voxel values provides a cut-off slope within a selected range of voxel values, and adjusting a relationship between opacity and voxel values comprises the step of changing a range of voxel values in which the cut-off slope is provided in response to a user-operated control;
   adjusting the visual parameter of the reduced-fidelity images during the rapid production to select a desired adjustment;
   producing a full-fidelity image derived from the image volume;
   applying the selected adjustment to the full-fidelity image; and
   updating the full-fidelity image by replacing images at nodes linked to slices being updated in the full-fidelity image.

2. A method in accordance with claim 1 wherein reconstructing the decimated image volume comprises the step of mapping three-dimensional textures formed from the decimated image volume using polygons to produce an intermediate rendering.

3. A method in accordance with claim 2 further comprising the steps of zooming the intermediate rendering with bilinear interpolation to display in a three-dimensional viewport.

4. A method in accordance with claim 2 further comprising the steps of zooming the intermediate rendering by pixel replication.

5. A method in accordance with claim 1 wherein a user-defined volume of interest is the adjustable visual parameter, and reconstructing the decimated image volume comprises the step of selectively providing a set of volume clipping planes to define the volume of interest.

6. A method in accordance with claim 5 wherein selectively providing a set of volume clipping planes to define the volume of interest comprises the step of providing sliding controls for right/left, anterior/posterior and superior/inferior clipping planes, and adjusting the volume clipping planes in accordance with adjustment of the sliding controls.

7. A method in accordance with claim 1 wherein rapidly producing reduced fidelity images comprises the step of sampling the decimated volume with spaced polygons at a first spacing; and producing a full-fidelity image comprises the step of sampling the full size image volume with spaced polygons at a second spacing, the first spacing being more widely spaced than the second spacing.

8. A method in accordance with claim 1 wherein the relationship between opacity and voxel value assigns higher opacities for a selected range of voxel values, and adjusting a relationship between opacity and voxel value comprises the step of changing a range of voxel values at which the higher values of opacity se assigned in response to adjustments of a user-operated control.

9. A method in accordance with claim 1 wherein the adjusting of the relationship between opacity and voxel value from a preset value is performed with a single control.

10. A method in accordance with claim 1 wherein rapidly producing a reduced fidelity image comprises the step of compositing mapping results into a first render matrix; and producing a full fidelity image comprises the step of compositing mapping results into a second render matrix, the first render matrix being smaller than the second render matrix.

11. An interactive image processor for rapid extraction and visualization of relevant data from a volume of image data, said interactive image processor configured to:
   rapidly produce reduced-fidelity images derived from an image volume, the reduced fidelity images having an adjustable visual parameter;
   adjust the visual parameter of the reduced-fidelity images during the rapid production to select a desired adjustment;
   produce a full-fidelity image derived from the image volume;
   apply the selected adjustment to the full-fidelity image, wherein said processor being configured to rapidly produce reduced-fidelity images derived from an image volume comprises said processor being configured to decimate a fuill-size image volume to produce a decimated image volume and to reconstruct the decimated image volume, wherein opacity is the adjustable visual parameter, and said processor being configured to reconstruct the decimated image volume comprises said processor being configured to adjust a relationship between opacity and voxel value from a preset level, wherein the relationship between opacity and voxel values provides a cut-off slope within a selected range of voxel values, and said processor being configured to adjust a relationship between opacity and voxel values comprises said processor being configured to change a range of voxel values in which the cut-off slope is provided in response to a user-operated control; and undated the full-fidelity image by replacing images at nodes linked to slices being updated in the full-fidelity image.

12. A processor in accordance with claim 11 wherein said processor being configured to reconstruct the decimated image volume comprises said processor being configured to map three dimensional textures formed from the decimated image volume using polygons to produce an intermediate rendering.

13. A processor in accordance with claim 12 further configured to zoom the intermediate rendering with bilinear interpolation to display in a three-dimensional viewport.

14. A processor in accordance with claim 12 further configured to zoom the intermediate rendering by pixel replication.

15. A processor in accordance with claim 14 wherein a user-defined volume of interest is the adjustable visual parameter, and said processor being configured to reconstruct the decimated image volume comprises said processor being configured to selectively provide a set of volume clipping planes to define the volume of interest.

16. A processor in accordance with claim 15 wherein said processor being configured to selectively provide a set of volume clipping planes to define the volume of interest comprises said processor being configured to provide sliding controls for right/left, anterior/posterior and superior/inferior clipping planes, and to adjust the volume clipping planes in accordance with adjustment of the sliding controls.

17. A processor in accordance with claim 11 wherein said processor being configured to rapidly produce reduced fidelity images comprises said processor being configured to sample the decimated volume with spaced polygons at a first spacing, and said processor being configured to produce a full-fidelity image comprises said processor being configured to sample the full size image volume with spaced polygons at a second spacing, the first spacing being more widely spaced than the second spacing.

18. A processor in accordance with claim 11 wherein the relationship between opacity and voxel value assigns higher opacities for a selected range of voxel values, and said processor being configured to adjust a relationship between opacity and voxel value comprises said processor being configured to change a range of voxel values at which the higher values of opacity are assigned in response to adjustments of a user-operated control.

19. A processor in accordance with claim 11 wherein said processor is configured to provide a single control for adjusting of the relationship between opacity and voxel value from a preset value.

20. A processor in accordance with claim 11 wherein said processor being configured to rapidly produce a reduced fidelity image comprises said processor being configured to composite mapping results into a first render matrix; and said processor being configured to produce a full fidelity image comprises said processor being configured to composite mapping results into a second render matrix, the first render matrix being smaller than second render matrix.

* * * * *

UNITED STATES PATENT AND TRADEMARK OFFICE
CERTIFICATE OF CORRECTION

PATENT NO. : 6,690,371 B1
DATED : February 10, 2004
INVENTOR(S) : Okerlund et al.

It is certified that error appears in the above-identified patent and that said Letters Patent is hereby corrected as shown below:

Column 14,
Line 31, after "values of opacity" delete "se" and insert therefor -- are --.

Column 16,
Line 5, after "first spacing" delete "," and insert therefor -- ; --.

Signed and Sealed this

Eighth Day of November, 2005

JON W. DUDAS
*Director of the United States Patent and Trademark Office*